United States Patent
He et al.

(10) Patent No.: US 11,773,976 B2
(45) Date of Patent: Oct. 3, 2023

(54) CUPSEAL FOR COMPRESSOR AND METHOD FOR PREPARING THE SAME

(71) Applicant: SAINT-GOBAIN PERFORMANCE PLASTICS CORPORATION, Solon, OH (US)

(72) Inventors: Tao He, Shanghai (CN); Jian Ma, Shanghai (CN); Xiaoye Liu, Shanghai (CN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/223,218

(22) Filed: Apr. 6, 2021

(65) Prior Publication Data
US 2021/0388902 A1 Dec. 16, 2021

(30) Foreign Application Priority Data
Jun. 12, 2020 (CN) .......................... 202010533382.X

(51) Int. Cl.
*F16J 15/02* (2006.01)
*F16J 9/14* (2006.01)
*F04D 29/10* (2006.01)
*C09K 3/10* (2006.01)

(52) U.S. Cl.
CPC ............ *F16J 15/022* (2013.01); *F04D 29/10* (2013.01); *F16J 9/14* (2013.01); *C09K 3/1009* (2013.01); *F05D 2240/55* (2013.01); *F05D 2300/432* (2013.01)

(58) Field of Classification Search
CPC ... F16J 15/022; F16J 15/56; F16J 9/14; F04D 29/10; C09K 3/1009; F05D 2240/55; F05D 2300/432
See application file for complete search history.

(56) References Cited

U.S. PATENT DOCUMENTS 1,097,563 A * 5/1914 Sowden ............... F16J 15/3204
                                              92/240
3,062,601 A * 11/1962 Sadler .................... F16J 15/322
                                              92/240

(Continued)

FOREIGN PATENT DOCUMENTS

JP       2015530521 A    10/2015
KR    20190101958 A    9/2019

OTHER PUBLICATIONS

International Search Report and Written Opinion for PCT/US2021/025871, dated Jul. 16, 2021, 10 pages.

*Primary Examiner* — Gilbert Y Lee
(74) *Attorney, Agent, or Firm* — Abel Schillinger, LLP; Ann Palma

(57) ABSTRACT

The subject application relates to a cupseal for a compressor and method for preparing the same. Systems and methods are disclosed that include providing an annular seal for a compressor. The annular seal includes a substantially planar first portion, a first angled portion extending at an angle from the substantially planar first portion, and a second angled portion extending radially at an angle from the first angled portion. The annular seal is formed from a fluorinated polymer and includes at least one additive or filler. The annular seal exhibits reduced wear and an increased lifespan.

20 Claims, 5 Drawing Sheets

(56) References Cited

U.S. PATENT DOCUMENTS

| | | | | |
|---|---|---|---|---|
| 3,168,301 | A | * | 2/1965 | Allinquant ............ F16F 9/3214 |
| | | | | 92/155 |
| 3,181,876 | A | * | 5/1965 | Felt ...................... F16J 15/3204 |
| | | | | 277/439 |
| 3,343,844 | A | * | 9/1967 | Leschisin ............. F16J 15/3208 |
| | | | | 92/194 |
| 3,572,732 | A | * | 3/1971 | Sekulich .............. F16J 15/3244 |
| | | | | 277/553 |
| 3,603,215 | A | * | 9/1971 | Leschisin .................. F16J 9/08 |
| | | | | 92/182 |
| 4,410,190 | A | * | 10/1983 | Potter .................. F16J 15/3204 |
| | | | | 277/560 |
| 4,515,378 | A | | 5/1985 | Marshall |
| 4,781,024 | A | | 11/1988 | Nakamura |
| 4,995,795 | A | * | 2/1991 | Hetzel ................. F04B 39/0027 |
| | | | | 417/571 |
| 5,022,312 | A | | 6/1991 | Rozek et al. |
| 6,213,000 | B1 | | 4/2001 | Wood |
| 6,349,630 | B1 | | 2/2002 | Wood |
| 6,676,130 | B2 | * | 1/2004 | Schmitt ................ F16J 15/3256 |
| | | | | 277/351 |
| 8,235,391 | B2 | | 8/2012 | Hatch et al. |
| 10,040,229 | B2 | | 8/2018 | Sommer et al. |
| 2012/0104701 | A1 | * | 5/2012 | Bertini ................. F16J 15/3212 |
| | | | | 277/573 |
| 2015/0361971 | A1 | | 12/2015 | Wood |
| 2020/0056030 | A1 | | 2/2020 | Thurnherr |

\* cited by examiner

CUPSEAL FOR COMPRESSOR AND METHOD FOR PREPARING THE SAME

CROSS-REFERENCE TO RELATED APPLICATIONS

This application claims priority to and the benefit of Chinese Patent Application No. 202010533382.X, filed on Jun. 12, 2020, by Tao H E et al., entitled "CUPSEAL FOR COMPRESSOR AND METHOD FOR PREPARING THE SAME," the disclosure of which is assigned to the current assignee hereof and incorporated herein by reference in its entirety for all purposes.

TECHNICAL FIELD

The subject application relates to a cupseal for a compressor and method for preparing the same.

BACKGROUND OF THE INVENTION

Seals are used in automotive, oil & gas, life sciences, and many other industries. Seals are typically used between components to maintain different fluidic pressures or separate different fluidic components on opposing sides of the seal. Many seals are continuously subjected to wear caused by relative movement between components of a machine or system. Failure of a seal in these applications may often result in failure of the machine or system in which the seal is installed and used. Accordingly, the industry continues to demand improvements in seal technology that reduces seal wear and prolongs seal life.

SUMMARY

Embodiments of the present invention relate in general to an annular seal for use in a compressor. Embodiments of the annular seal may include a first portion, which in some embodiments may be substantially planar, a first angled portion extending radially at an angle from the substantially planar first portion, and a second angled portion extending radially at an angle from the first angled portion. Embodiments of the annular seal may be formed from a fluorinated polymer and at least one additive or filler. Embodiments of the annular seal exhibit reduced wear and an increased lifespan.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Annular Seal

Figure 1A:
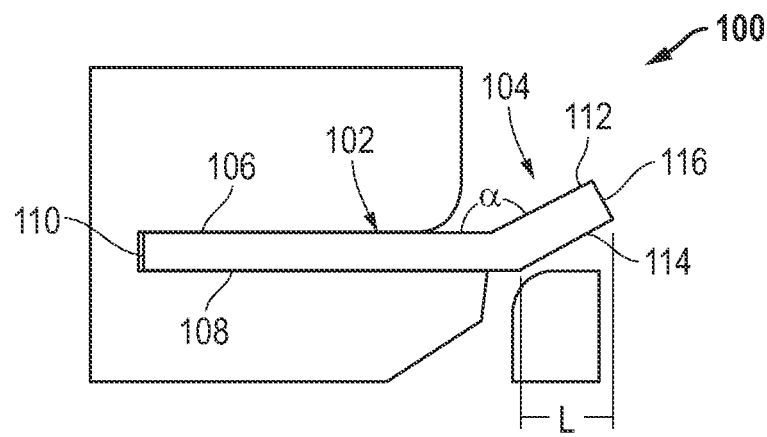
FIG. 1A is a cross-sectional view of a partially formed annular seal according to an embodiment of the disclosure.

FIG. 1 shows a cross-sectional view of a partially-formed annular seal 100 according to an embodiment of the disclosure. In some embodiments, the partially-formed seal 100 of FIG. 1A may represent a first step in forming the seal 100. The partially-formed seal 100 may generally comprise a first portion 102 and a second portion 104. In some embodiments, the first portion 102 may be substantially planar and include an upper surface 106, a lower surface 108 opposite the upper surface 106, and an inner annular surface 110 disposed between the upper surface 106 and the lower surface 108 that defines an opening through the seal 100. In some embodiments, the second portion 104 may extend radially at an angle ($\alpha$) from the first portion 102 and comprise an upper angled surface 112 disposed at the angle ($\alpha$) with respect to the upper surface 106 of the first portion 102, a lower angled surface 114 disposed at the angle ($\alpha$) with respect to the lower surface 108 of the first portion 102, and an outer annular surface 116 disposed between the upper angled surface 112 and the lower angled surface 114. Further, in some embodiments, the second portion 104 may be formed in the seal 100 by machining and/or milling, 3-D printing, spin forming, spin welding the first portion 102 to the second portion 104, or any other process known in the art.

The second portion 104 may extend radially from the first portion 102 at an angle ($\alpha$) prior to the formation of a third portion disposed between the first portion 102 and the second portion 104. The angle ($\alpha$) may be designed to ensure optimum performance of the seal 100. In some embodiments, the second portion 104 may extend radially from the first portion 102 at an angle ($\alpha$) of at least 130 degrees, at least 135 degrees, at least 140 degrees, at least 145 degrees, at least 146 degrees, at least 147 degrees, at least 148 degrees, at least 149 degrees, or at least 150 degrees prior to formation of the third portion. In some embodiments, the second portion 104 may extend radially from the first portion 102 at an angle ($\alpha$) of not greater than 175 degrees, not greater than 170 degrees, not greater than 165 degrees, not greater than 160 degrees, not greater than 159 degrees, not greater than 158 degrees, not greater than 157 degrees, not greater than 156 degrees, or not greater than 155 degrees prior to formation of the third portion. Further, it will be appreciated that the second portion 104 may extend radially from the first portion 102 at an angle ($\alpha$) between any of these minimum and maximum values, such as at least 130 degrees to not greater than 175 degrees, or even at least 145 degrees to not greater than 160 degrees. As will be described herein in more detail, in some embodiments, the angle ($\alpha$) may be designed to achieve optimum performance of the seal 100, when the seal 100 is utilized in a compressor, and/or the angle ($\alpha$) may ensure desired alignment in a cylinder of a compressor, which may reduce wear in the seal 100 and/or extend the life of the seal 100.

In some embodiments, the second portion 104 may comprise a radial width of at least 0.5 mm, at least 0.75 mm, at least 1 mm, at least 1.1 mm, at least 1.2 mm, at least 1.3 mm, at least 1.4 mm, or at least 1.5 mm. In some embodiments, the second portion 104 may comprise a radial width of not greater than 10 mm, not greater than 9 mm, not greater than 8 mm, not greater than 7 mm, not greater than 6 mm, not greater than 5 mm, not greater than 4 mm, not greater than 3 mm, or not greater than 2.5 mm. Further, it will be appreciated that the second portion 104 may comprise a radial width between any of these minimum and maximum values, such as at least 0.5 mm to not greater than 10 mm, or even at least 1 mm to not greater than 3 mm.

Figure 1B:
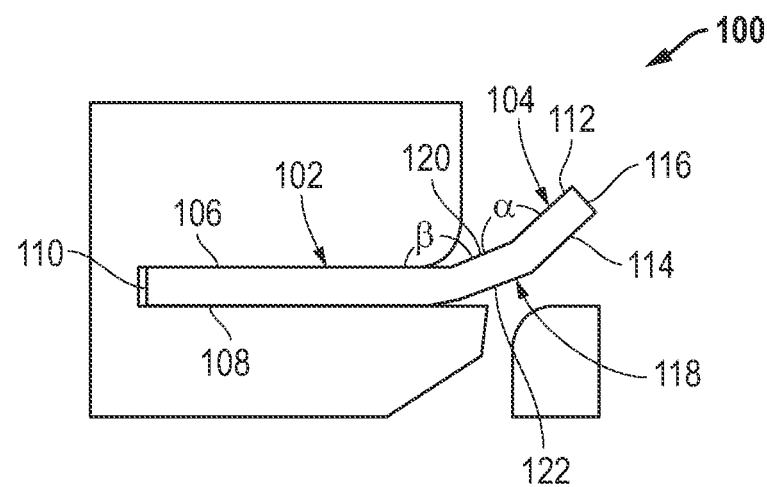
FIG. 1B is a cross-sectional view of a formed annular seal according to an embodiment of the disclosure.

FIG. 1B shows a cross-sectional view of a fully-formed annular seal 100 according to an embodiment of the disclosure. The formed seal 100 may generally comprise a third portion 118 formed between the first portion 102 and the second portion 104. In some embodiments, the third portion 118 may be formed in the seal 100 by heat forming. In some embodiments, the third portion 118 may be formed in the seal 100 by machining and/or milling, 3-D printing, spin forming, spin welding, or any other process known in the art. Accordingly, in some embodiments, the third portion 118 may be formed from a portion of the first portion 102 after the second portion 104 is formed. In some embodiments, forming the third portion 118 may reduce the overall angle between the first portion 102 and the second portion 104. In some embodiments, the third portion 118 may extend radially at an angle (β) from the first portion 102 and comprise an upper angled surface 120 disposed at the angle (β) with respect to the upper surface 106 of the first portion 102 and a lower angled surface 122 disposed at the angle (β) with respect to the lower surface 108 of the first portion 102. As such, it will be appreciated that the second portion 104 may extend from the third portion 118 in the formed seal 100 of FIG. 1B, such that the upper angled surface 112 of the second portion 104 may be disposed at the angle (α) with respect to the upper angled surface 120 of the third portion 118, and the lower angled surface 114 of the second portion 104 may be disposed at the angle (α) with respect to the lower angled surface 122 of the third portion 118.

The third portion 118 may extend radially from the first portion 102 at an angle (β) prior to being installed in a compressor or other assembly. This angle (β) may be designed to ensure optimum performance of the seal 100. In some embodiments, the third portion 118 may extend radially from the first portion 102 at an angle (β) of at least 130 degrees, at least 135 degrees, at least 140 degrees, at least 145 degrees, at least 146 degrees, at least 147 degrees, at least 148 degrees, at least 149 degrees, or at least 150 degrees. In some embodiments, the third portion 118 may extend radially from the first portion 102 at an angle (β) of not greater than 175 degrees, not greater than 170 degrees, not greater than 165 degrees, not greater than 160 degrees, not greater than 159 degrees, not greater than 158 degrees, not greater than 157 degrees, not greater than 156 degrees, or not greater than 155 degrees. Further, it will be appreciated that the third portion 118 may extend radially from the first portion 102 at an angle (β) between any of these minimum and maximum values, such as at least 130 degrees to not greater than 175 degrees, or even at least 145 degrees to not greater than 160 degrees. As will be described herein in more detail, in some embodiments, the angle (β) may be designed to achieve optimum performance of the seal 100, when the seal 100 is utilized in a compressor, and/or the angle (β) may ensure desired alignment in a cylinder of a compressor, which may reduce wear in the seal 100 and extend the life of the seal 100.

When the seal 100 is formed as shown in FIG. 1B, the seal 100 may generally comprise a substantially planar first portion 102, a first angled portion (third portion 118) extending radially at an angle (β) from the first portion 102, and a second angled portion (second portion 104) extending radially at an angle (α) from the third portion 118. Accordingly, it will be appreciated that one or more of the angles (α, β) may be designed to reduce wear in the seal 100 and/or extend the life of the seal 100.

Formation of the Seal

The seal 100 may generally be formed by machining and/or milling the components (e.g., first portion 102 and second portion 104) of the seal 100, 3-D printing, injection molding, rotational molding, blow molding, casting, spin forming, spin welding the first portion 102 to the second portion 104, vacuum forming, heat forming, or any other process known in the art. In some embodiments, the seal 100 may be formed by a combination of one or more processes. For example, in at least one embodiment, the seal 100 may be formed by a two-step process, as shown in FIGS. 1A and 1B, where FIG. 1A represents a first step to form α and FIG. 1B represents a second step to form β. Alternatively, in some embodiments, β may be formed first, and α may be formed second. In such embodiments, a preform component may be formed. In some embodiments, the first portion 102 and the second portion 104 as shown in FIG. 1A may be formed from the preform component to form a partially-formed seal 100. To complete forming the seal 100, the third portion 118 shown in FIG. 1B may be formed between the first portion 102 and the second portion 104 from the partially-formed seal 100 shown in FIG. 1A to produce the fully-formed seal 100 shown in FIG. 1B. However, in alternative embodiments, the steps of forming the seal 100 may be reversed or even performed simultaneously. Accordingly, as shown in FIG. 1B, the fully-formed seal 100 may be ready for installation in a compressor.

Composition

The seal 100 may generally be formed from a thermoplastic, a thermoset, or a combination thereof. In some embodiments, the seal 100 may be formed from a fluoropolymer, such as polytetrafluoroethylene (PTFE), polyvinyl fluoride (PVF), polyvinylidene fluoride (PVDF), fluorinated ethylene propylene (FEP), ethylene tretrafluoroethylene (ETFE), poly tetrafluoroethylene perfluoropropylvinylether (PFA), poly tetrafluoroethylene perfluoromethylvinylether (MFA), ethylene chlorotrifluoroethylene (ECTFE), polychlorotrifluoroethylene (PCTFE), tetrafluoroethylene hexafluoropropylene vinylidene fluoride (THV), or a combination thereof. In a specific embodiment, the seal 100 may be formed from a fluoropolymer consisting essentially of polytetrafluoroethylene (PTFE).

In some embodiments, the fluorinated polymer may comprise at least 50 wt. %, at least 55 wt. %, at least 60 wt. %, at least 65 wt. %, at least 70 wt. %, or at least 75 wt. % of the seal 100. In some embodiments, the fluorinated polymer may comprise not greater than 95 wt. %, not greater than 90 wt. %, not greater than 85 wt. %, or not greater than 80 wt. % of the seal 100. Further, it will be appreciated that the amount of fluorinated polymer may be between any of these minimum and maximum values, such as at least 50 wt. % to not greater than 95 wt. %, or even at least 70 wt. % to not greater than 90 wt. % of the seal 100.

The fluorinated polymer may comprise one or more fillers that provide certain desired performance properties to the seal 100, which include, but are not limited to mechanical strength, lubricity, wear resistance, and life expectancy. In some embodiments, the filler may comprise carbon, graphite, polyphenylene sulfide (PPS), a polyarylketone such as PEEK, PK, PEK, PEKK, PEKEKK, a crosslinked polytetrafluoroethylene, a polyimide such as PEI or TPI, a polyether ether ketone, a polybenzimidazole, tungsten disulfide ($WS_2$), molybdenum disulfide ($MoS_2$), or a combination thereof. In some embodiments, the one or more fillers may comprise at least 5 wt. %, at least 10 wt. %, at least 15 wt. %, at least 16 wt. %, at least 17 wt. %, at least 18 wt. %, at least 19 wt. %, or at least 20 wt. % of the seal 100. In some embodiments, the one or more fillers may comprise not greater than 35 wt. %, not greater than 30 wt. %, not greater than 25 wt. %, not greater than 24 wt. %, not greater than 23 wt. %, not greater than 22 wt. %, not greater than 21 wt. %, not greater than 20 wt. %, or not greater than 15 wt. % of the seal 100. Further, it will be appreciated that the amount of one or more fillers may be between any of these minimum and maximum values, such as at least 5 wt. % to not greater than 35 wt. %, or even at least 10 wt. % to not greater than 30 wt. % of the seal 100.

In some embodiments, the polyphenylene sulfide (PPS) may comprise at least 0.5 wt. %, at least 5 wt. %, at least 6 wt. %, at least 7 wt. %, at least 8 wt. %, at least 9 wt. %, or at least 10 wt. % of the seal 100. In some embodiments, the polyphenylene sulfide (PPS) may comprise not greater than 25 wt. %, not greater than 20 wt. %, not greater than 15 wt. %, not greater than 14 wt. %, not greater than 13 wt. %, not greater than 12 wt. %, not greater than 11 wt. %, or not greater than 10 wt. % of the seal 100. Further, it will be appreciated that the amount of polyphenylene sulfide (PPS) may be between any of these minimum and maximum values, such as at least 0.5 wt. % to not greater than 25 wt. %, or even at least 5 wt. % to not greater than 15 wt. % of the seal 100.

In some embodiments, the carbon may comprise at least 0.5 wt. %, at least 5 wt. %, at least 6 wt. %, at least 7 wt. %, at least 8 wt. %, at least 9 wt. %, or at least 10 wt. % of the seal 100. In some embodiments, the carbon may comprise not greater than 25 wt. %, not greater than 20 wt. %, not greater than 15 wt. %, not greater than 14 wt. %, not greater than 13 wt. %, not greater than 12 wt. %, not greater than 11 wt. %, or not greater than 10 wt. % of the seal 100. Further, it will be appreciated that the amount of carbon may be between any of these minimum and maximum values, such as at least 0.5 wt. % to not greater than 25 wt. %, or even at least 5 wt. % to not greater than 15 wt. % of the seal 100.

In some embodiments, the graphite may comprise at least 0.5 wt. %, at least 1 wt. %, at least 1.5 wt. %, at least 2.0 wt. %, at least 2.5 wt. %, or at least 3 wt. % of the seal 100. In some embodiments, the graphite may comprise not greater than 15 wt. %, not greater than 10 wt. %, not greater than 9 wt. %, not greater than 8 wt. %, not greater than 7 wt. %, not greater than 6 wt. %, or not greater than 5 wt. % of the seal 100. Further, it will be appreciated that the amount of graphite may be between any of these minimum and maximum values, such as at least 0.5 wt. % to not greater than 15 wt. %, or even at least 2.0 wt. % to not greater than 10 wt. % of the seal 100.

In some embodiments, the molybdenum disulfide ($MoS_2$) may comprise at least 0.05 wt. %, at least 0.5 wt. %, at least 1 wt. %, at least 2.5 wt. %, at least 5 wt. %, at least 7.5 wt. %, or at least 10 wt. % of the seal 100. In some embodiments, the molybdenum disulfide ($MoS_2$) may comprise not greater than 20 wt. %, not greater than 15 wt. %, not greater than 14 wt. %, not greater than 13 wt. %, not greater than 12 wt. %, not greater than 11 wt. %, or not greater than 10 wt. %, of the seal 100. Further, it will be appreciated that the amount of molybdenum disulfide ($MoS_2$) may be between any of these minimum and maximum values, such as at least 0.05 wt. % to not greater than 20 wt. %, or even at least 0.5 wt. % to not greater than 10 wt. % of the seal 100.

Further, in some embodiments, the fluorinated polymer may comprise a plurality of fillers. In one exemplary embodiment, the seal 100 may comprise at least 50 wt. % to not greater than 95 wt. % of fluorinated polymer, at least 0.5 wt. % to not greater than 15 wt. % of polyphenylene sulfide (PPS), at least 5 wt. % to not greater than 25 wt. % of carbon, and at least 0.05 wt. % to not greater than 10 wt. % of molybdenum disulfide ($MoS_2$), graphite, or a combination thereof. In another exemplary embodiment, the seal 100 may comprise at least 70 wt. % to not greater than 90 wt. % of fluorinated polymer, at least 5 wt. % to not greater than 15 wt. % of polyphenylene sulfide (PPS), at least 5 wt. % to not greater than 15 wt. % of carbon, and 0.5 wt. % to not greater than 10 wt. % of molybdenum disulfide ($MoS_2$).

Compressor

Figure 2:
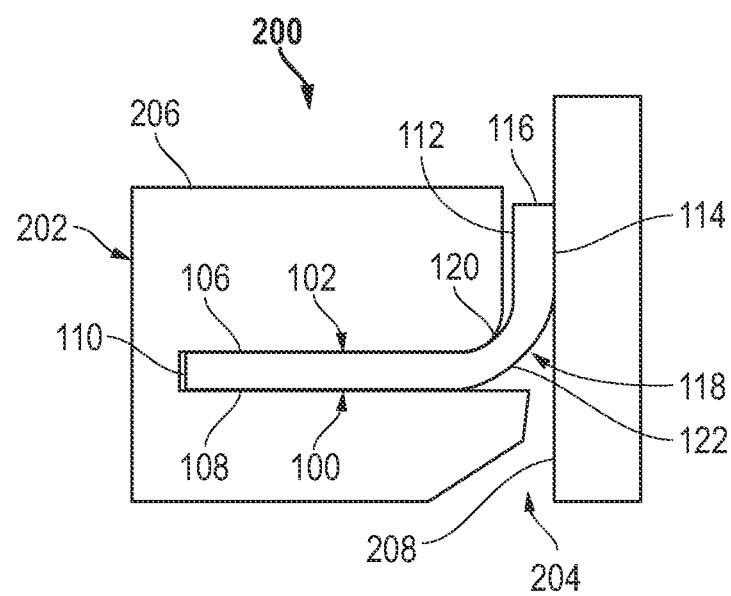
FIG. 2 is a partial cross-sectional view of a compressor having an annular seal 100 according to an embodiment of the disclosure.

FIG. 2 shows a partial cross-sectional view of a compressor 200 having an annular seal 100 according to an embodiment of the disclosure. In some embodiments, the compressor 200 may be a wobble compressor ("wobble pump"), such as those used in oxygen concentrators, or the like. The seal 100 may be at least partially received within a recess of a piston 202 positioned within a bore or cylinder 204 of the compressor 200. The seal 100 may extend around the circumference of the piston 202. In some embodiments, the seal 100 may be disposed adjacent to a piston head 206 of the piston 202, such as near the piston crown. The seal 100 may extend from the piston 202 radially outward and contact a surface 208 of the cylinder 204 of the compressor 200 to form a fluid tight seal between the piston 202 and the cylinder 204 of the compressor 200. In some embodiments, the seal 100 may be the only portion of the piston 202 in contact with the surface 208 of the cylinder 204. In such embodiments, the seal 100 may form function as a bearing surface for the piston 202 against the surface 208 of the cylinder 204 during piston strokes. Further, in some embodiments, the seal 100 may maintain contact with the surface 208 of the cylinder 204 during the piston 202 stroke cycle when the piston articulates within the cylinder 204.

In some embodiments, the seal 100 may at least partially bend, conform, distort, or otherwise flex to the size of the cylinder 208, such that the lower angled surface 114 of the second portion 104 contacts the surface 208 of the cylinder 204 of the compressor 200. In some embodiments, the seal 100 may further bend, conform, distort, or otherwise flex to reduce the angle ($\beta$) between the first portion 102 and the third portion 118 to fit within the cylinder 204 of the compressor. Accordingly, it will be appreciated that one or more of the angles ($\alpha$, $\beta$) may be designed to ensure desired alignment in the cylinder 204 of the compressor 200, such that the lower angled surface 114 of the second portion 104 may be substantially parallel to and in contact with the surface 208 of the cylinder 204 of the compressor 200. In some embodiments, the angles ($\alpha$, $\beta$) may be designed to reduce wear in the seal 100 and extend the life of the seal 100.

It will be appreciated that the seal 100 may generally comprise a larger diameter than the cylinder 208 of the compressor 200. In some embodiments, the seal 100 may comprise a diameter of at least 10 mm to not greater than 300 mm. Further, in some embodiments, the seal 100 may comprise a thickness of at least 0.25 mm to not greater than 5.00 mm. Accordingly, when the seal 100 is installed for operation, the seal 100 may form a fluid tight seal between the piston 202 and the cylinder 208 of the compressor 200.

Figure 3:
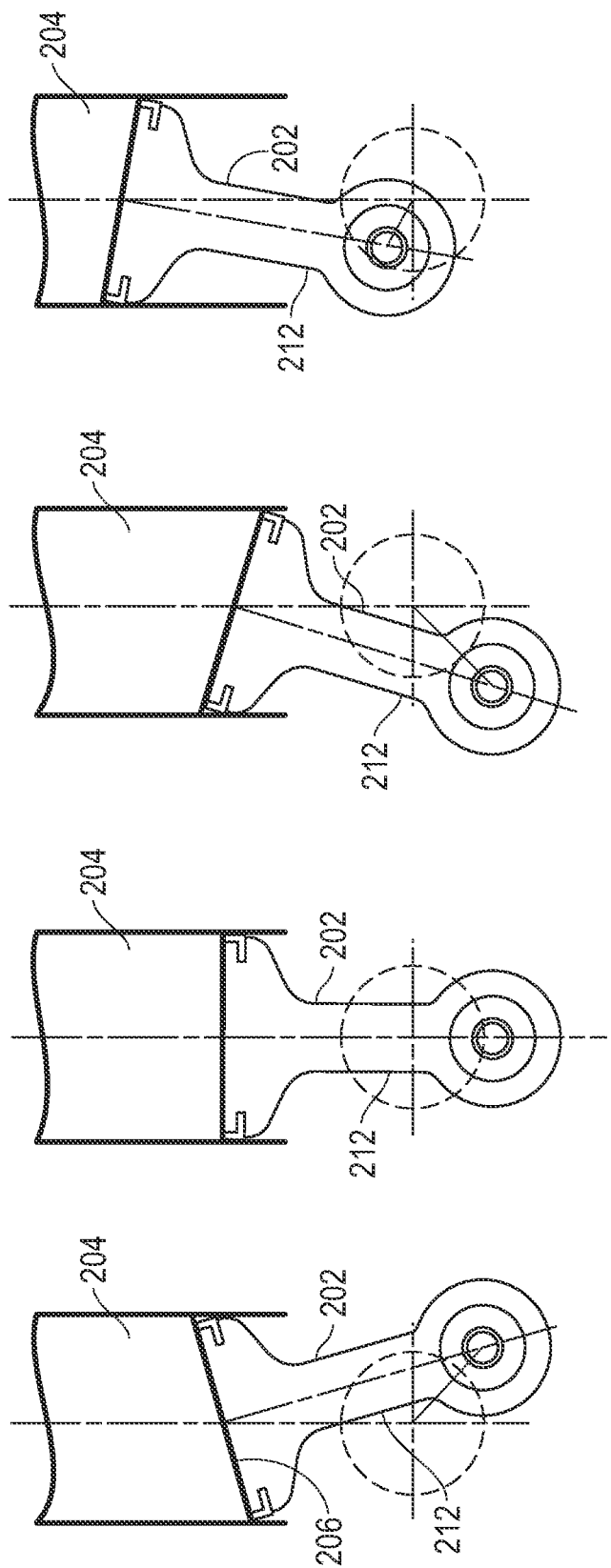
FIGS. 3A to 3D are schematic views of a compressor during a piston stroke according to an embodiment of the disclosure.

FIGS. 3A to 3D show schematic views of a compressor 200 during a piston stroke according to an embodiment of the disclosure. In operation and beginning with a downward movement of the stroke as shown in FIG. 3A, the piston 202 may reach a bottom dead center position within the cylinder 204 as shown in FIG. 3B, before returning upward as shown in FIG. 3C, where the piston 202 may reach a top dead center position as shown in FIG. 3D. In some embodiments, the piston 202 may repeatedly stroke within the cylinder 204 between the bottom dead center position (FIG. 3B) and the top dead center position (FIG. 3D) to facilitate generation of pressure therein.

During downward movement of the piston 202 as shown in FIG. 3A, the piston head 206 may be disposed in a negative range of angles. Conversely, during upward movement of the piston 202 as shown in FIG. 3C, the piston head 206 may be disposed in a positive range of angles. In some embodiments, the piston 202 and/or piston head 206 may oscillate between angles of approximately −30° and 30°, as measured relative to a central axis of the cylinder 204. In more particular embodiments, the piston head 206 may oscillate between approximately −25° and 25°, between approximately −20° and 20°, between approximately −15° and 15°, between approximately −10° and 10°, or between approximately −5° and 5°. However, in some embodiments, the piston 202 and/or the piston head 206 may remain fixed at an angle of approximately 90 degrees relative to the connecting rod 212 during the entire piston stroke.

It will be appreciated that the range of oscillation of the piston 202 and/or piston head 206 may be based upon the relative geometry of the compressor 200. For instance, a longer crank radius or shorter length of a connecting rod 212 may create a greater oscillation or wobble. Embodiments of seals 100 described herein may generally be adapted to accommodate a range of oscillation angles within the cylinder 204. More specifically, the seals 100 may be adapted to flex and conform to the perceived changing aspect ratio of the cylinder 204 exhibited during wobble of the piston 202 while maintaining effective sealing characteristics therein. Thus, during the wobbling of the piston 202 and/or piston head 206 within the cylinder 204 during each piston stroke, the seal 100 maintains a fluid tight seal.

In some embodiments, when the seal 100 is installed about and/or coupled with the piston 202 and disposed within the cylinder 204 of the compressor 200, the seal 100 may comprise an assembly load (or installation force) of at least 15 N, at least 17 N, at least 20 N, at least 21 N, at least 22 N, at least 23 N, at least 24 N, or at least 24.5 N. In some embodiments, the when the seal 100 is installed about and/or coupled with the piston 202 and disposed within the cylinder 204 of the compressor 200, the seal 100 may comprise an assembly load of not greater than 50 N, not greater than 45 N, not greater than 40 N, not greater than 35 N, not greater than 34 N, not greater than 33 N, not greater than 32 N, not greater than 31 N, or not greater than 30 N. Further, it will be appreciated that when the seal 100 is installed about and/or coupled with the piston 202 and disposed within the cylinder 204 of the compressor 200, the seal 100 may comprise an assembly load between any of these minimum and maximum values, such as at least 15 N to not greater than 50 N, or even at least 20 N to not greater than 30 N.

The seal 100 may generally be configured to exhibit reduced wear and an extended lifetime over traditional seals. In some embodiments, the seal 100 may wear not greater than 0.15 mm, not greater than 0.14 mm, not greater than 0.13 mm, not greater than 0.12 mm, not greater than 0.11 mm, not greater than 0.10 mm, not greater than 0.09 mm, not greater than 0.08 mm, or not greater than 0.07 mm per 1000 hours for a duration of at least 1000 hours, at least 2000 hours, at least 3000 hours, at least 4000 hours, at least 5000 hours, at least 10,000 hours, at least 11,000 hours, at least 12,000 hours, at least 13,000 hours, at least 14,000 hours, or at least 15,000 hours. Further, in some embodiments, the seal 100 may comprise an operating life as measured at an operating speed of at least 1000 strokes per minute (SPM) of at least 10,000 hours, at least 11,000 hours, at least 12,000 hours, at least 13,000 hours, at least 14,000 hours, or at least 15,000 hours.

Traditional seals often require a break-in period before they provide effective sealing. For example, traditional seals can experience premature break-in period wear of 0.1 mm to 0.2 mm (or sometimes even greater) before the traditional seals provide effective sealing within the compressor 200. In some instances, this can take up to 1000 hours of run time. However, the seal 100 may drastically reduce the break-in wear or even altogether eliminate the break-in wear. In some embodiments, the seal 100 may at least partially reduce the amount of run time required during the break-in period by at least 10%, at least 25%, or even at least 50%. However, in some embodiments, the seal 100 may completely eliminate the need for a break-in period, such that the seal 100 may provide immediate effective sealing within the compressor 200.

Method of Forming a Seal in a Compressor

Figure 4:
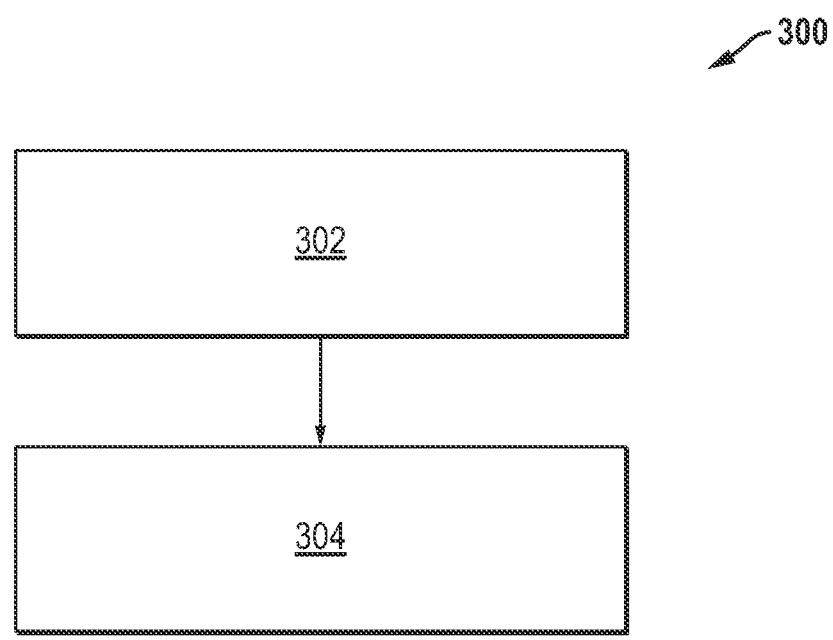
FIG. 4 is a flowchart of a method of forming a fluid tight seal in a compressor according to an embodiment of the disclosure.

FIG. 4 shows a flowchart of a method 300 of forming a fluid tight seal in a compressor 200 according to an embodiment of the disclosure. The method 300 may begin at block 302 by providing a compressor 200 comprising a piston 202 and an annular seal 100 coupled with the piston 202 and comprising a substantially planar first portion 102, a first angled portion (third portion 118) extending radially at an angle (β) from the first portion 102, and a second angled portion (second portion 104) extending radially at an angle (α) from the third portion 118. In some embodiments, the seal 100 may be designed such that the lower angled surface 114 of the second portion 104 contacts the surface 208 of the cylinder 204 of the compressor 200. In some embodiments, the seal 100 may be designed such that the lower angled surface 114 of the second portion 104 is disposed substantially parallel and in contact with the surface 208 of the cylinder 204 of the compressor 200. The method 300 may continue at block 304 by operating the compressor for at least 1000 hours, wherein the seal 100 wears not greater than 0.12 mm, not greater than 0.11 mm, not greater than 0.10 mm, not greater than 0.09 mm, not greater than 0.08 mm, or not greater than 0.07 mm during the at least 1000 hours.

In some embodiments, the method 300 may comprise wearing the seal 100 not greater than 0.12 mm, not greater than 0.11 mm, not greater than 0.10 mm, not greater than 0.09 mm, not greater than 0.08 mm, not greater than 0.07 mm per 1000 hours for a duration of at least 1000 hours, at least 2000 hours, at least 3000 hours, at least 4000 hours, at least 5000 hours, at least 10,000 hours, at least 11,000 hours, at least 12,000 hours, at least 13,000 hours, at least 14,000 hours, or at least 15,000 hours. In some embodiments, the method 300 may comprise achieving an operating life of the seal 100 of at least 10,000 hours, at least 11,000 hours, at least 12,000 hours, at least 13,000 hours, at least 14,000 hours, or at least 15,000 hours as measured at an operating speed of at least 1000 strokes per minute (SPM).

EXAMPLES

Figure 5:
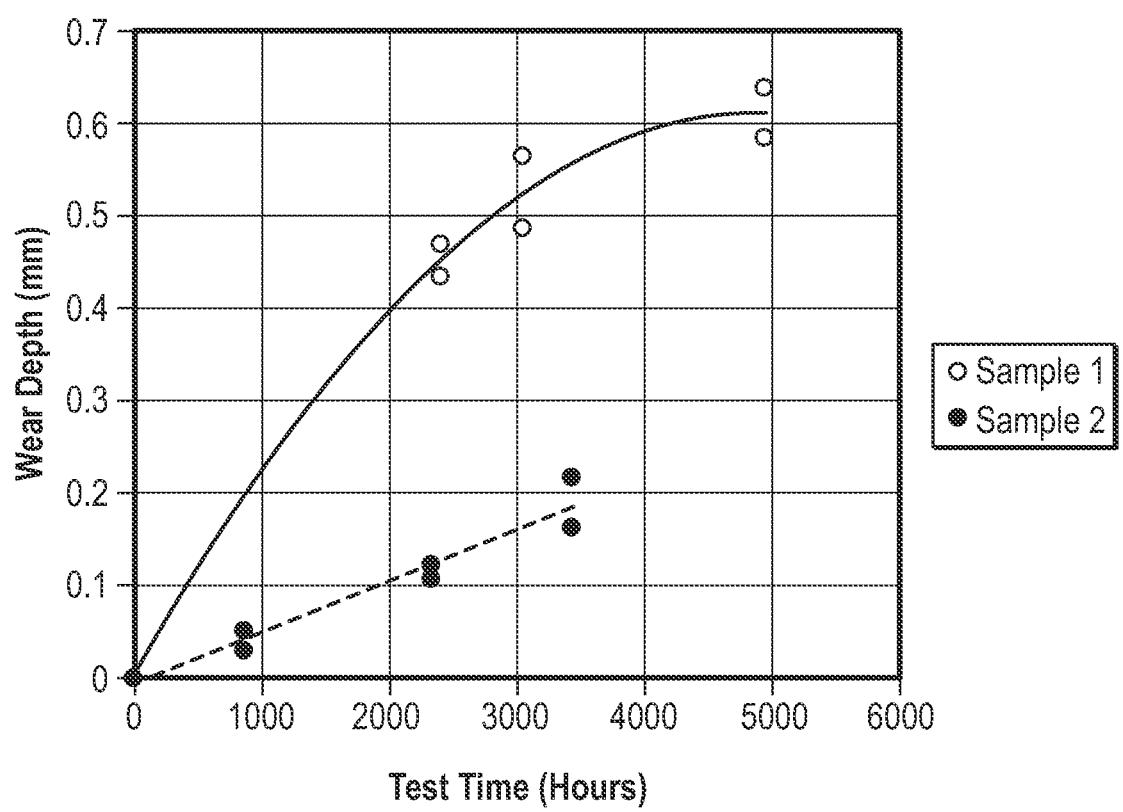
FIG. 5 includes a graph of wear depth as a function of test time of a traditional seal and a seal according to an embodiment of the disclosure.

FIG. 5 shows a graph of wear depth as a function of test time of a traditional seal and a seal 100 according to an embodiment of the disclosure. As shown in FIG. 4, Sample 1 represents a traditional seal having a preformed angled portion and represents a seal 100 according to an embodiment of the disclosure. Samples 1 and 2 are each formed from the same fluorinated polymeric material and shown tested for wear depth as a function of test time. Clearly, Sample 2 exhibits much less wear as compared to Sample 1. Consequently, Sample 2 will also achieve an extended lifetime as disclosed herein over the traditional seal of Sample 1. In some embodiments, the reduced amount of wear and extended lifetime may be attributed to the dual preformed angled portions (second portion 104, third portion 118) of the seal 100.

Embodiments of the annular seal 100, the compressor 200, and/or method 300 of forming a fluid tight seal may include, inter alia, one or more of the following:

Embodiment 1. An annular seal, comprising: a substantially planar first portion; a first angled portion extending radially at an angle from the substantially planar first portion; and a second angled portion extending radially at an angle from the first angled portion.

Embodiment 2. A compressor, comprising: a piston; and an annular seal coupled with the piston and comprising: a substantially planar first portion; a first angled portion extending radially at an angle from the substantially planar first portion; and a second angled portion extending radially at an angle from the first angled portion.

Embodiment 3. The seal or compressor of any of embodiments 1 to 2, wherein the substantially planar first portion comprises an upper surface, a lower surface opposite the upper surface, and an inner annular surface disposed between the upper surface and the lower surface that defines an opening through the seal.

Embodiment 4. The seal or compressor of embodiment 3, wherein the first angled portion comprises an upper angled surface disposed at an angle with respect to the upper surface of the substantially planar first portion and a lower angled surface disposed at an angle with respect to the lower surface of the substantially planar first portion.

Embodiment 5. The seal or compressor of any of embodiments 1 to 4, wherein the angle is at least 130 degrees, at least 135 degrees, at least 140 degrees, at least 145 degrees, at least 146 degrees, at least 147 degrees, at least 148 degrees, at least 149 degrees, or at least 150 degrees.

Embodiment 6. The seal or compressor of any of embodiment 5, wherein the angle is not greater than 175 degrees, not greater than 170 degrees, not greater than 165 degrees, not greater than 160 degrees, not greater than 159 degrees, not greater than 158 degrees, not greater than 157 degrees, not greater than 156 degrees, or not greater than 155 degrees.

Embodiment 7. The seal or compressor of any of embodiments 1 to 6, wherein the second angled portion is formed in the seal prior to formation of the first angled portion in the seal.

Embodiment 8. The seal or compressor of embodiment 7, wherein the first angled portion is formed in the seal by heat forming, machining, milling, 3-D printing, spin forming, spin welding, or combinations thereof after the second angled portion is formed in the seal by machining, milling, 3-D printing, spin forming, spin welding, or combinations thereof prior to formation of the first angled portion.

Embodiment 9. The seal or compressor of any of embodiments 7 to 8, wherein the second angled portion comprises an upper angled surface disposed at an angle with respect to the upper surface of the substantially planar first portion, a lower angled surface disposed at an angle with respect to the lower surface of the substantially planar first portion, and an outer annular surface disposed between the upper angled surface and the lower angled surface prior to the formation of the first angled portion.

Embodiment 10. The seal or compressor of embodiment 9, wherein the angle is at least 130 degrees, at least 135 degrees, at least 140 degrees, at least 145 degrees, at least 146 degrees, at least 147 degrees, at least 148 degrees, at least 149 degrees, or at least 150 degrees.

Embodiment 11. The seal or compressor of embodiment 10, wherein the angle is not greater than 175 degrees, not greater than 170 degrees, not greater than 165 degrees, not greater than 160 degrees, not greater than 159 degrees, not greater than 158 degrees, not greater than 157 degrees, not greater than 156 degrees, or not greater than 155 degrees.

Embodiment 12. The seal or compressor of any of embodiments 9 to 11, wherein the angle is designed such that the lower angled surface of the second angled portion is configured to contact a surface of a cylinder of the compressor.

Embodiment 13. The seal or compressor of embodiment 12, wherein the angle is designed such that the lower angled surface of the second angled portion is configured to be substantially parallel to the surface of the cylinder of the compressor Embodiment 14. The seal or compressor of any of embodiments 7 to 13, wherein a radial width of the second angled portion is at least 0.5 mm, at least 0.75 mm, at least 1 mm, at least 1.1 mm, at least 1.2 mm, at least 1.3 mm, at least 1.4 mm, or at least 1.5 mm prior to the formation of the first angled portion.

Embodiment 15. The seal or compressor of embodiment 14, wherein the radial width of the second angled portion is not greater than 10 mm, not greater than 9 mm, not greater than 8 mm, not greater than 7 mm, not greater than 6 mm, not greater than 5 mm, not greater than 4 mm, not greater than 3 mm, or not greater than 2.5 mm prior to the formation of the first angled portion.

Embodiment 16. The seal or compressor of any of embodiments 1 to 15, wherein the seal comprises an assembly load or installation force of at least 15 N, at least 17 N, at least 20 N, at least 21 N, at least 22 N, at least 23 N, at least 24 N, or at least 24.5 N when the seal is coupled with a piston and disposed within a cylinder of a compressor.

Embodiment 17. The seal or compressor of embodiment 16, wherein the seal comprises an assembly load or installation force of not greater than 50 N, not greater than 45 N, not greater than 40 N, not greater than 35 N, not greater than 34 N, not greater than 33 N, not greater than 32 N, not greater than 31 N, or not greater than 30 N when the seal is coupled with a piston and disposed within a cylinder of a compressor.

Embodiment 18. The seal or compressor of any of embodiments 1 to 17, wherein the annular seal is formed from a thermoplastic, a thermoset, or a combination thereof.

Embodiment 19. The seal or compressor of embodiment 18, wherein the seal is formed from a fluorinated polymer, such as polytetrafluoroethylene (PTFE), polyvinyl fluoride (PVF), polyvinylidene fluoride (PVDF), or a combination thereof.

Embodiment 20. The seal or compressor of embodiment 19, wherein the fluorinated polymer comprises at least 50 wt. %, at least 55 wt. %, at least 60 wt. %, at least 65 wt. %, at least 70 wt. %, or at least 75 wt. % of the seal.

Embodiment 21. The seal or compressor of embodiment 20, wherein the fluorinated polymer comprises not greater than 95 wt. %, not greater than 90 wt. %, not greater than 85 wt. %, or not greater than 80 wt. % of the seal.

Embodiment 22. The seal or compressor of any of embodiments 19 to 21, wherein the fluorinated polymer comprises at least one filler.

Embodiment 23. The seal or compressor of embodiment 22, wherein the filler comprises carbon, graphite, polyphenylene sulfide (PPS), a crosslinked polytetrafluoroethylene, a polyimide, a polyether ether ketone, a polybenzimidazole, tungsten disulfide ($WS_2$), molybdenum disulfide ($MoS_2$), or a combination thereof.

Embodiment 24. The seal or compressor of embodiment 23, wherein the seal comprises at least 0.5 wt. % to not greater than 15 wt. % of polyphenylene sulfide (PPS).

Embodiment 25. The seal or compressor of any of embodiments 23 to 24, wherein the seal comprises at least 5 wt. % to not greater than 25 wt. % of carbon.

Embodiment 26. The seal or compressor of any of embodiments 23 to 25, wherein the seal comprises at least 0.5 wt. % to not greater than 15 wt. % of graphite.

Embodiment 27. The seal or compressor of any of embodiments 25 to 26, wherein the seal comprises at least 0.05 wt. % to not greater than 10 wt. % of molybdenum disulfide ($MoS_2$).

Embodiment 28. The seal or compressor of any of embodiments 1 to 27, wherein the seal comprises: at least 50 wt. % to not greater than 95 wt. % of fluorinated polymer; at least 0.5 wt. % to not greater than 15 wt. % of polyphenylene sulfide (PPS); at least 5 wt. % to not greater than 25 wt. % of carbon; and at least 0.05 wt. % to not greater than 10 wt. % of molybdenum disulfide ($MoS_2$), graphite, or a combination thereof.

Embodiment 29. The seal or compressor of any of embodiments 1 to 28, wherein the seal comprises a diameter of at least 10 mm to not greater than 300 mm.

Embodiment 30. The seal or compressor of embodiment 29, wherein the seal comprises a thickness of at least 0.25 mm to not greater than 5.00 mm.

Embodiment 31. The seal or compressor of any of embodiments 1 to 30, wherein the seal is configured for operation in a compressor.

Embodiment 32. The seal or compressor of any of embodiments 1 to 31, wherein the seal forms a fluid tight seal between the piston and a cylinder of the compressor.

Embodiment 33. The seal or compressor of any of embodiments 1 to 32, wherein the seal wears not greater than 0.12 mm, not greater than 0.11 mm, not greater than 0.10 mm, not greater than 0.09 mm, not greater than 0.08 mm, or not greater than 0.07 mm per 1000 hours for a duration of at least 1000 hours, at least 2000 hours, at least 3000 hours, at least 4000 hours, at least 5000 hours, at least 10,000 hours, at least 11,000 hours, at least 12,000 hours, at least 13,000 hours, at least 14,000 hours, or at least 15,000 hours.

Embodiment 34. The seal or compressor of any of embodiments 1 to 33, wherein the seal comprises an operating life as measured at an operating speed of at least 1000 strokes per minute (SPM) of at least 10,000 hours, at least 11,000 hours, at least 12,000 hours, at least 13,000 hours, at least 14,000 hours, or at least 15,000 hours.

Embodiment 35. A method of forming a seal, comprising: providing a preform component; forming a substantially planar first portion and a second portion, such that the second portion extends at an angle from the substantially planar first portion; and forming a third portion between the substantially planar first portion and the second portion, such that the third portion extends at an angle from the substantially planar first portion and the second portion extends at an angle from the third portion.

Embodiment 36. The method of embodiment 35, wherein the angle is at least 130 degrees, at least 135 degrees, at least 140 degrees, at least 145 degrees, at least 146 degrees, at least 147 degrees, at least 148 degrees, at least 149 degrees, or at least 150 degrees.

Embodiment 37. The method of embodiment 36, wherein the angle is not greater than 175 degrees, not greater than 170 degrees, not greater than 165 degrees, not greater than 160 degrees, not greater than 159 degrees, not greater than 158 degrees, not greater than 157 degrees, not greater than 156 degrees, or not greater than 155 degrees.

Embodiment 38. The method of any of embodiments 35 to 37, wherein the seal comprises: at least 50 wt. % to not greater than 95 wt. % of fluorinated polymer; at least 0.5 wt. % to not greater than 5 wt. % of polyphenylene sulfide (PPS); at least 5 wt. % to not greater than 25 wt. % of carbon; and at least 0.05 wt. % to not greater than 10 wt. % of molybdenum disulfide ($MoS_2$), graphite, or a combination thereof.

Embodiment 39. A method of forming a fluid tight seal in a compressor, comprising: providing a compressor comprising a piston and an annular seal coupled with the piston and comprising a substantially planar first portion, a first angled portion extending radially at an angle from the substantially planar first portion, and a second angled portion extending radially at an angle from the first angled portion; and operating the compressor for at least 1000 hours, wherein the seal wears not greater than 0.12 mm, not greater than 0.11 mm, not greater than 0.10 mm, not greater than 0.09 mm, not greater than 0.08 mm, or not greater than 0.07 mm during the at least 1000 hours.

Embodiment 40. The method of embodiment 39, wherein the seal comprises: at least 50 wt. % to not greater than 95 wt. % of fluorinated polymer; at least 0.5 wt. % to not greater than 5 wt. % of polyphenylene sulfide (PPS); at least 5 wt. % to not greater than 25 wt. % of carbon; and at least 0.05 wt. % to not greater than 10 wt. % of molybdenum disulfide ($MoS_2$), graphite, or a combination thereof.

Embodiment 41. The method of any of embodiments 39 to 40, further comprising: wearing the seal not greater than 0.15 mm, not greater than 0.14 mm, not greater than 0.13 mm, not greater than 0.12 mm, not greater than 0.11 mm, not greater than 0.10 mm, not greater than 0.09 mm, not greater than 0.08 mm, not greater than 0.07 mm per 1000 hours for a duration of at least 1000 hours, at least 2000 hours, at least 3000 hours, at least 4000 hours, at least 5000 hours, at least 10,000 hours, at least 11,000 hours, at least 12,000 hours, at least 13,000 hours, at least 14,000 hours, or at least 15,000 hours.

Embodiment 42. The method of any of embodiments 39 to 41, further comprising: achieving an operating life of the seal of at least 10,000 hours, at least 11,000 hours, at least 12,000 hours, at least 13,000 hours, at least 14,000 hours, or at least 15,000 hours as measured at an operating speed of at least 1000 strokes per minute (SPM).

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub-combination. Further, references to values stated in ranges include each and every value within that range.

What is claimed is:

1. An annular seal, comprising:
    a planar first portion;
    a first angled portion comprising an upper angled surface extending radially at a first angle from the planar first portion, wherein the upper angled surface of the first portion is disposed on an axially upward side of the first angled portion; and
    a second angled portion comprising an upper angled surface extending radially at a second angle from the first angled portion, wherein the first angle is at least 130 degrees and not greater than 175 degrees, wherein the planar first portion comprises a planar upper surface extending from an inner annular surface to the first angled portion, wherein the first angle is different than the second angle, wherein the upper angled surface of the second portion is contiguous with the upper angled surface of the first portion, wherein the seal has a substantially constant thickness.

2. The seal of claim 1, wherein the planar first portion comprises a lower surface opposite the upper surface, and wherein the inner annular surface is disposed between the upper surface and the lower surface that defines an opening through the seal.

3. The seal of claim 1, wherein the first angle is at least 135 degrees.

4. The seal of claim 3, wherein the first angle is not greater than 170 degrees.

5. The seal of claim 4, wherein the second angle is at least 130 degrees.

6. The seal of claim 5, wherein the second angle is not greater than 175 degrees.

7. The seal of claim 6, wherein the first angle and the second angle are designed such that a lower angled surface of the second angled portion is configured to contact a surface of a cylinder of the compressor.

8. The seal of claim 7, wherein the first angle and the second angle are designed such that the lower angled surface of the second angled portion is configured to be substantially parallel to the surface of the cylinder of the compressor.

9. The seal of claim 1, wherein the second angled portion is formed in the seal prior to formation of the first angled portion in the seal.

10. The seal of claim 1, wherein the seal comprises an assembly load or installation force of at least 15 N when the seal is coupled with a piston and disposed within a cylinder of a compressor.

11. The seal of claim 10, wherein the seal comprises an assembly load or installation force of not greater than 50 N, when the seal is coupled with a piston and disposed within a cylinder of a compressor.

12. The seal of claim 1, wherein the seal is formed from a fluorinated polymer, such as polytetrafluoroethylene (PTFE), polyvinyl fluoride (PVF), polyvinylidene fluoride (PVDF), or a combination thereof.

13. The seal of claim 12, wherein the fluorinated polymer comprises at least one filler, and wherein the filler comprises carbon, graphite, polyphenylene sulfide (PPS), a crosslinked polytetrafluoroethylene, a polyimide, a polyether ether ketone, a polybenzimidazole, tungsten disulfide ($WS_2$), molybdenum disulfide ($MoS_2$), or a combination thereof.

14. The seal of claim 13, wherein the seal comprises:
    at least 50 wt. % to not greater than 95 wt. % of fluorinated polymer;
    at least 0.5 wt. % to not greater than 15 wt. % of polyphenylene sulfide (PPS);
    at least 5 wt. % to not greater than 25 wt. % of carbon; and
    at least 0.05 wt. % to not greater than 10 wt. % of molybdenum disulfide ($MoS_2$), graphite, or a combination thereof.

15. The seal of claim 1, wherein the seal is configured for operation in a compressor and forms a fluid tight seal between the piston and a cylinder of the compressor.

16. The seal of claim 15, wherein the seal wears not greater than 0.12 mm per 1000 hours for a duration of at least 1000 hours.

17. The seal of claim 16, wherein the seal comprises an operating life as measured at an operating speed of at least 1000 strokes per minute (SPM) of at least 10,000 hours.

18. A compressor, comprising:
    a cylinder;
    a piston disposed within the cylinder; and
    an annular seal at least partially received within a recess of the piston and comprising:

a planar first portion;
a first angled portion comprising an upper angled surface extending radially at an angle from the planar first portion, wherein the upper angled surface of the first portion is disposed on an axially upward side of the first angled portion; and
a second angled portion comprising an upper angled surface extending radially at an angle from the first angled portion;
wherein the annular seal forms a fluid tight seal between the piston and a cylinder of the compressor, wherein the first angle is at least 130 degrees and not greater than 175 degrees, wherein the planar first portion comprises a planar upper surface extending from an inner annular surface to the first angled portion, wherein the first angle is different than the second angle, wherein the upper angled surface of the second portion is contiguous with the upper angled surface of the first portion, wherein the seal has a substantially constant thickness.

19. The compressor of claim 18, wherein the seal wears not greater than 0.12 mm per 1000 hours for a duration of at least 1000 hours.

20. The compressor of claim 19, wherein the seal comprises an operating life as measured at an operating speed of at least 1000 strokes per minute (SPM) of at least 10,000 hours.

* * * * *